(12) United States Patent
Accoto

(10) Patent No.: US 12,235,177 B2
(45) Date of Patent: Feb. 25, 2025

(54) FORCE SENSING DEVICE WITH ISOTROPIC COMPLIANCE

(71) Applicant: NANYANG TECHNOLOGICAL UNIVERSITY, Singapore (SG)

(72) Inventor: Dino Accoto, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 225 days.

(21) Appl. No.: 17/784,309

(22) PCT Filed: Dec. 11, 2020

(86) PCT No.: PCT/IB2020/061817
§ 371 (c)(1),
(2) Date: Jun. 10, 2022

(87) PCT Pub. No.: WO2021/116995
PCT Pub. Date: Jun. 17, 2021

(65) Prior Publication Data
US 2023/0040951 A1  Feb. 9, 2023

(30) Foreign Application Priority Data
Dec. 12, 2019 (SG) .......................... 10201912037V

(51) Int. Cl.
*G01L 5/16* (2020.01)
*G01L 1/12* (2006.01)
(Continued)

(52) U.S. Cl.
CPC .............. *G01L 5/16* (2013.01); *G01L 1/122* (2013.01); *G01L 1/142* (2013.01); *G01L 1/24* (2013.01)

(58) Field of Classification Search
CPC . G01L 1/18; G01L 1/2287; G01L 1/22; G01L 1/26; G01L 1/16; G01L 25/00;
(Continued)

(56) References Cited

U.S. PATENT DOCUMENTS 5,541,622 A   7/1996  Engle et al.
5,642,469 A *  6/1997  Hannaford ............... B25J 13/02
                                                700/264
(Continued)

FOREIGN PATENT DOCUMENTS

EP   0426492 A2   5/1991
EP   2780680 B1   10/2016
(Continued)

*Primary Examiner* — Andre J Allen
(74) *Attorney, Agent, or Firm* — Barnes & Thornburg LLP

(57) ABSTRACT

Device with isotropic planar compliance comprising a floating body (2) positioned between a first (3) and second frame (4), said floating body having an extended portion (21) protruding through the first frame, at least a row of caged balls (5) supporting the floating body, at least one elastic element (6) positioned over the extended portion of the floating body, compressed between and connecting the floating body and the first frame. Said caged balls allow the at least one elastic element to laterally deform, so that their axis bends, while the ends of said at least one elastic element lay on two parallel planes, which remain at constant distance while sliding one with respect to the other. The device comprises also at least one displacement sensor (10), for measuring the displacement of the floating body with respect to the first or second frame.

12 Claims, 3 Drawing Sheets

(51) Int. Cl.
*G01L 1/14* (2006.01)
*G01L 1/24* (2006.01)

(58) Field of Classification Search
CPC . G01L 1/142; G01L 1/20; G01L 5/162; G01L 5/1627; G01L 1/2206; G01L 1/205; G01L 1/14; G01L 5/16; G01L 5/165; G01L 1/246; G01L 1/242; G01L 1/2231; G01L 1/2262; G01L 1/146; G01L 5/226; G01L 1/2293; G01L 1/04; G01L 5/166; G01L 1/2243; G01L 5/00; G01L 5/161; G01L 1/24; G01L 1/125; G01L 5/167; G01L 1/005; G01L 1/2281; G01L 5/0061; G01L 1/00; G01L 5/0038; G01L 1/144; G01L 1/12; G01L 1/225; G01L 1/122; G01L 1/148; G01L 1/162; G01L 5/0028; G01L 5/164; G01L 1/127; G01L 5/0004; G01L 5/169; G01L 1/2268; G01L 5/228; G01L 1/2218; G01L 5/22; G01L 5/225; G01L 5/0019; G01L 1/165; G01L 3/1457; G01L 5/223; G01L 5/10; G01L 9/0055; G01L 3/108; G01L 5/009; G01L 5/0076; G01L 1/2225; G01L 5/136; G01L 1/2237; G01L 1/044; G01L 1/243; G01L 5/24; G01L 5/28; G01L 1/02; G01L 5/102; G01L 1/183; G01L 3/102; G01L 1/247; G01L 9/04; G01L 1/10; G01L 5/0052; G01L 1/106; G01L 3/00; G01L 5/04; G01L 1/241; G01L 5/0042; G01L 9/0052; G01L 5/101; G01L 9/16; G01L 5/103; G01L 5/221; G01L 1/25; G01L 1/042; G01L 19/04; G01L 5/108; G01L 1/245; G01L 19/0092; G01L 9/0054; G01L 9/0042; G01L 5/0009; G01L 5/0033; G01L 5/12; G01L 5/045; G01L 3/105; G01L 19/0618; G01L 19/147; G01L 5/0085; G01L 1/255; G01L 3/10; G01L 3/14; G01L 9/0072; G01L 3/103; G01L 5/243; G01L 9/0022; G01L 11/02; G01L 19/086; G01L 19/143; G01L 11/025; G01L 3/1435; G01L 9/12; G01L 27/002; G01L 5/0057; G01L 5/0047; G01L 5/106; G01L 3/101; G01L 23/10; G01L 3/106; G01L 5/1623; G01L 1/06; G01L 19/0645; G01L 25/003; G01L 5/107; G01L 9/0051; G01L 9/06; G01L 1/2256; G01L 5/0071; G01L 9/0073; G01L 9/02; G01L 9/08; G01L 1/103; G01L 15/00; G01L 5/105; G01L 19/0023; G01L 1/167; G01L 9/00; G01L 11/00; G01L 5/173; G01L 9/0041; G01L 19/14; G01L 23/18; G01L 3/02; G01L 3/1478; G01L 17/005; G01L 5/066; G01L 9/0025; G01L 9/007; G01L 5/133; G01L 1/086; G01L 19/06; G01L 5/008; G01L 9/0048; G01L 9/18; G01L 9/0019; G01L 9/006; G01L 9/0075; G01L 1/048; G01L 9/0027; G01L 9/0047; G01L 9/065; G01L 13/025; G01L 19/003; G01L 19/141; G01L 3/104; G01L 3/109; G01L 5/20; G01L 9/0002; G01L 5/047; G01L 1/248; G01L 25/006; G01L 27/00; G01L 3/1471; G01L 7/00; G01L 9/008; G01L 19/0007; G01L 27/005; G01L 3/08; G01L 3/1421; G01L 5/13; G01L 11/04; G01L 19/00; G01L 19/0046; G01L 19/0627; G01L 5/18; G01L 9/0032; G01L 9/045; G01L 3/1464; G01L 3/242; G01L 5/06; G01L 3/1442; G01L 5/171; G01L 5/286; G01L 7/02; G01L 9/0098; G01L 19/0069; G01L 3/24; G01L 5/14; G01L 7/182; G01L 7/185; G01L 1/2275; G01L 17/00; G01L 19/0681; G01L 19/083; G01L 19/148; G01L 23/16; G01L 5/03; G01L 9/0001; G01L 9/002; G01L 9/0039; G01L 9/0086; G01L 1/2212; G01L 19/0038; G01L 3/107; G01L 7/082; G01L 9/0016; G01L 9/0079; G01L 1/186; G01L 23/22; G01L 5/163; G01L 9/0008; G01L 9/0023; G01L 9/0064; G01L 9/0077; G01L 13/02; G01L 19/0084; G01L 19/02; G01L 19/12; G01L 19/142; G01L 23/08; G01L 3/245; G01L 5/042; G01L 7/08; G01L 7/086; G01L 9/0014; G01L 9/0017; G01L 9/10; G01L 11/06; G01L 19/0061; G01L 23/222; G01L 3/12; G01L 9/0004; G01L 9/0007; G01L 9/0044; G01L 9/0058; G01L 9/0083; G01L 9/14; G01L 1/046; G01L 1/08; G01L 13/00; G01L 19/145; G01L 2009/0066; G01L 2019/0053; G01L 3/04; G01L 3/1407; G01L 3/247; G01L 5/0095; G01L 5/168; G01L 7/026; G01L 7/028; G01L 9/0011; G01L 9/025; G01L 1/083; G01L 2009/0067; G01L 2009/0069; G01L 27/007; G01L 3/045; G01L 3/22; G01L 7/022; G01L 7/04; G01L 7/16; G01L 7/163; G01L 9/0026; G01L 9/003; G01L 9/005; G01L 9/125

See application file for complete search history.

(56) References Cited

U.S. PATENT DOCUMENTS

| | | | |
|---|---|---|---|
| 5,650,704 A | 7/1997 | Pratt et al. | |
| 5,790,101 A | 8/1998 | Schoch et al. | |
| 9,622,825 B2* | 4/2017 | Phee | A61B 34/30 |
| 11,541,530 B1* | 1/2023 | Wu | B25J 9/0015 |
| 2010/0283340 A1 | 11/2010 | Fradella | |
| 2015/0075250 A1* | 3/2015 | Kosa | G01L 25/00 |
| | | | 73/862.041 |
| 2023/0123289 A1* | 4/2023 | Wu | A61H 1/0274 |
| | | | 601/5 |

FOREIGN PATENT DOCUMENTS

| | | |
|---|---|---|
| IT | UB20152737 A1 | 1/2017 |
| WO | 2020084980 A1 | 4/2020 |

\* cited by examiner

FORCE SENSING DEVICE WITH ISOTROPIC COMPLIANCE

Present invention refers to a device with isotropic planar compliance and addresses the field of physical Human-Robot Interaction (pHRI). pHRI occurs whenever a machine, endowed with robotic capabilities, is in direct contact with the human body for different purposes, including applying controlled forces, as in the case of assistive and rehabilitation systems, receiving force inputs, as in the case of telemanipulation, physical exercising and gaming.

The present invention relates to a compliant device having an elastic element with force sensing capabilities. The device can be used as an input device enabling haptic capabilities (e.g. for teleoperation and gaming) or as a compliant force sensor, to be mounted in the proximity of the end-effector for controlling pHRI (e.g. for physical assistance and rehabilitation).

In the general case the same machine is expected to be able to both apply a controlled force (i.e. to operate in the direct mode) and to be displaced or back driven as an effect of a force applied by the user (i.e. to operate in the reverse mode).

A machine capable of operating in both modes is said to be reversible or back drivable.

Reversible machines can be divided into two categories. A first category includes intrinsically reversible machines, that is, machines which can move retrogradely by virtue of their mechanical structure. These machines are generally characterized by low friction, so as to achieve a kinematic efficiency in direct motion above 50%; moreover, they are characterized by small equivalent inertia perceived at the end-effector. The advantage of these category of back drivable machines is that they can be passive while operating retrogradely, i.e. they can be moved by the user without any need to properly control the machine itself.

The disadvantage of this category of machines is that the technical solutions for reducing the mechanical friction and the perceived inertia usually have a negative impact on the cost of goods.

The second category includes machines that can operate retrogradely by appropriately controlling the actuators, to greatly reduce the interaction force between the machine and the user. The advantage of this approach is that it allows to limit the costs of the mechanical structure. The disadvantage is that the interaction force can be effectively cancelled only if its frequency content falls within the force control bandwidth. Consequently, any interaction forces characterized by a high frequency content, for example generated by an involuntary collision between the user and the machine, or due to a sudden motion, e.g. induced by a muscular spasm, cannot be effectively cancelled out. As a result, the machine is perceived as stiff, at least at the beginning of the movements.

To solve this problem the use of actuators integrating elastic elements between a gearmotor and a load has been proposed [U.S. Pat. No. 5,650,704 A, Pratt et al.].

Compliant actuators are an effective solution for allowing a machine to be back driven if they can be mounted very close to the end-effector.

If this arrangement is not possible, e.g. for safety or kinematic reasons, the mechanical impedance of organs interposed between the end effector and the actuators would reflect a non-zero interaction force, especially when the frequency content spans a large bandwidth.

It can be easily understood that the need of mounting the actuators near the end-effector may result in a major constraint for the designer during the design process. Moreover, such approach is not always pursuable, due to safety reasons.

Another approach to overcome such limitations consists in decoupling the elastic element from the motors, placing only said elastic element close to the end-effector, while the motors can be placed where convenient [ITUB20152737 (A1) D, Accoto et al].

Conventional force sensors, e.g. load cells, are designed to be stiff, since their compliance, for most of the applications, is considered as a parasitic effect inherent to the transduction mechanism.

Since load cells are not intended to exhibit a large compliance, their stiffness is not guaranteedly constant, nor isotropic.

The present invention relates to a compliant device having an elastic element with force sensing capabilities to be used in the above described scenario. Ideally, the device should satisfy the following requirements:

1. The elastic element should be able to measure the interaction force while displaying a known, constant, and possibly isotropic stiffness in all the possible directions of the interaction force.
2. The stiffness should be small enough to limit the interaction force to acceptably small values during the lapse of time required by the control system to adapt the configuration of the machine to comply with the desired force intensity.
3. The device should be easily mountable on a plurality of machines, e.g. by means of a standard flange; in addition, it should be compact and low weight.
4. The device should be reliable and low-cost.

Finally, considering that most operations occur in the horizontal plane (e.g. rehabilitation upper limb robots for shoulder and elbow; joysticks), we introduce an additional requirement (5) that the controlled force should lay on a plane.

In EP2780680B1 an optical transduction means is adopted to measure forces or induced deformations. The optical elements of the transducers are buried inside an elastomeric matrix, essentially cylindrical in shape, which provides an almost isotropic compliance in the plane perpendicular to its axis.

Although quite relevant to the present invention, this prior art does not violate the novelty requirement, because the sensor described therein is essentially different from what is disclosed hereby in that it does not resort to any deformable elastomeric matrices, nor it requires other types of polymeric deformable organs. U.S. Pat. No. 5,541,622 "Miniature isometric joystick" discloses a miniature isometric joystick for receiving manual user input to effect directional control, such as controlling cursor movement on a computer display screen or controlling movement of an apparatus such as a machine or robot. In particular, U.S. Pat. No. 5,541,622 discloses the configuration of the floating body, spring, and frame as in the present invention. However, the configuration does not allow the floating body to translate in the x-y plane due to the use of rubber bumps in contact to the sensor surface. Specifically, U.S. Pat. No. 5,541,622 does not disclose the use of caged balls for supporting the floating body and facilitating movement in the x-y plane.

Differently from the device described in U.S. Pat. No. 5,541,622, the floating body in the present invention is shaped as an inverted "T" (FIG. 1). This specific configuration has the advantage of making the device more compact in terms of thickness in the z-direction.

U.S. Pat. No. 5,790,101 "Ergonomic control apparatus" relates to an ergonomic control apparatus, which is provided for producing signals in response to human feedback to control aircrafts, land vehicles, computers, video games and the like. U.S. Pat. No. 5,790,101 discloses the use of ball bearings and tracks, which is analogous to the caged balls of the present invention, to allow for the translational movement of a control stick in the x-y plane.

Differently from the present invention, the control stick in U.S. Pat. No. 5,790,101 is allowed to tilt. Importantly, the translations in the x-y plane are allowed by tracks, while the adjustable resistive force (either generated by friction or by elastic means) is not isotropic in the working plane.

Present invention relates to a device with isotropic planar compliance having the characteristic of the enclosed independent claim 1.

Further features of the device of the present invention are disclosed in the enclosed dependant claims.

The characteristics and advantages of the device will become clearer from the following description of embodiments thereof given as a non-limiting example with reference to the attached drawings, in which.

Figure 1:
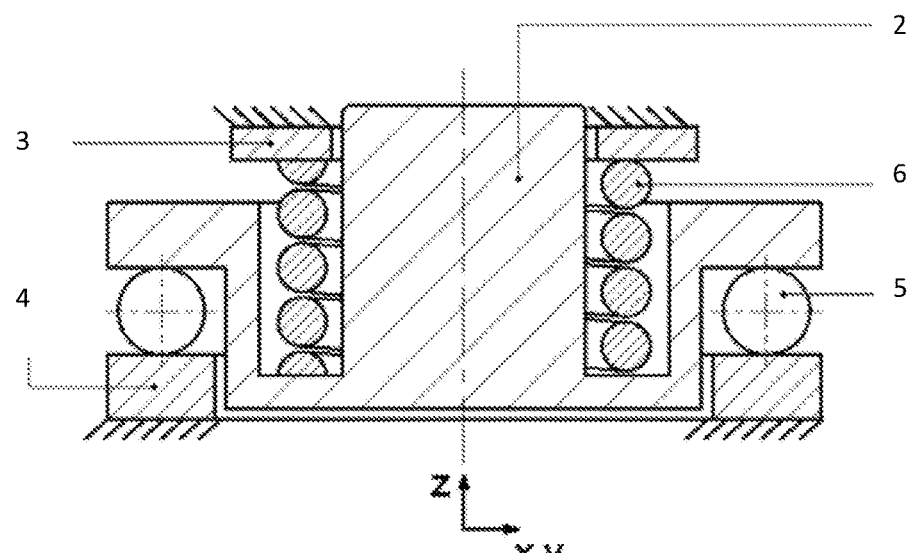
FIG. 1 shows a schematic assembly of the device of present invention.

With reference to the above mentioned figures, the device of present invention comprises a floating body 2 positioned between a first 3 and second frame 4, and having an extended portion protruding through the first frame. At least a row of caged balls 5 support the floating body over the first and second frames; and at least one elastic element 6 is positioned over the extended portion of the floating body, compressed between and connecting the floating body and the first frame. The caged balls allow the at least one elastic element to laterally deform, so that their axis bends, while the ends of said at least one elastic element lay on two parallel planes, which remain at constant distance while sliding one with respect to the other.

The device further comprises at least one displacement sensors for measuring the displacement of the floating body with respect to the first or second frame.

Said displacement sensor may comprise two uniaxial displacement sensors mounted in quadrature with each other.

Said displacement sensor may comprise two at least one biaxial displacement sensor, for example two biaxial displacement sensors mounted in quadrature with each other.

With reference to FIG. 1, the end-effector (not shown) is connected to the floating body 2. The floating body is pushed by the compression spring 6 against the row of caged balls 5, as in a thrust ball bearing arrangement. The compression spring 6 is compressed between first frame, at the top, and the floating body, at the bottom.

Figure 2:
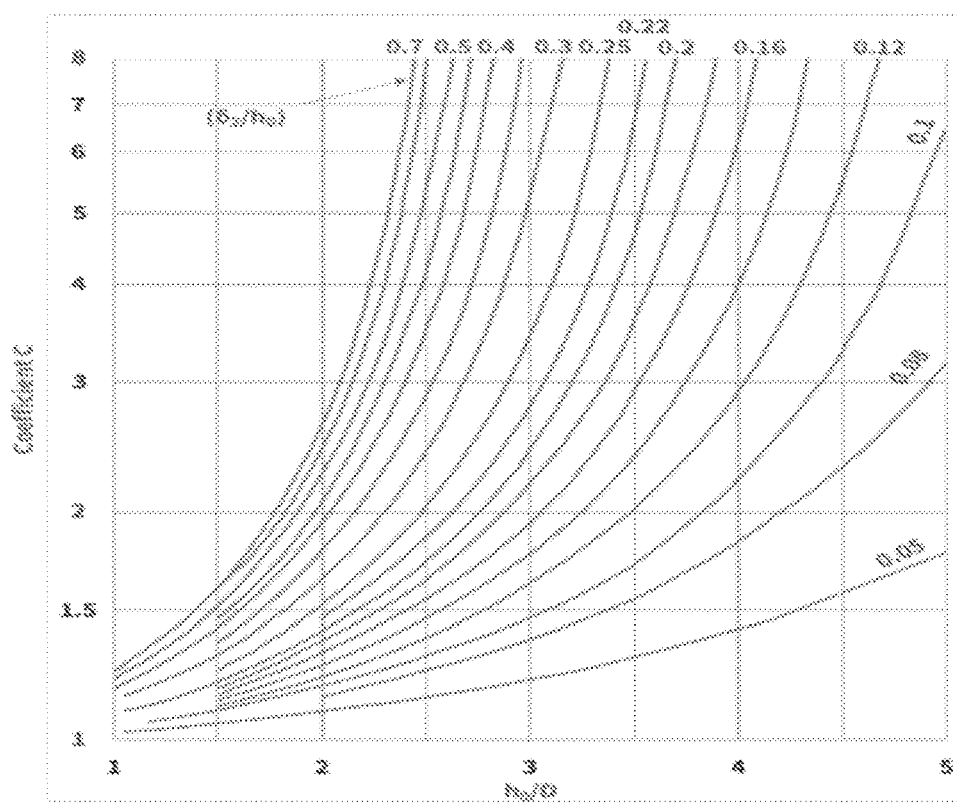
FIG. 2 shows a graph of the trend of a parameter depending on the geometry of a spring of the device according to the present invention, from which the compression factor of the spring itself is calculated.

Vertical, i.e. along the z-direction, forces are transferred to the frame through the balls 5. Horizontal forces, i.e. forces laying in the x-y plane, cause a translation in the same plane of the floating body, and a corresponding flexion of the axis of the compressed spring 6. The flexural bending of the axis of the compression spring generates a proportional centering force. Therefore, the compression spring, which may be compressed along the z-direction, is equivalent to an isotropic linear spring in the x-y plane. The corresponding stiffness in the x-y plane can be computed according to the following equation (units: N/mm):

$$k = \frac{k_z}{C\left(0.294\frac{h_s^2}{D^2} + 0.382\right)}$$

where $k_z$ is the compression stiffness, $h_s$ is the height of the spring in operational conditions (i.e. compressed) and D is the diameter of the compression spring. The parameter C in the formula depends from the length at rest of the spring ($h_0$) and the spring compression, i.e. the change in length (shortening) after compression ($\delta_2$), as shown in FIG. 2.

Tilting moments would cause the overturning of the floating body only after exceeding a threshold value, set by the compressive force and the radius of the ball row.

Torques around the z-axis, which are supposedly of low intensity if the handle is free to spindle around the z axis of the floating body, are counteracted by the torsion stiffness of the spring.

Horizontal forces, i.e. in the x- and y-directions, cause the translation of the floating body, thanks to the rolling of the balls over parallel planar surfaces.

The component of the interaction force in the x-y plane is calculated by multiplying the displacement of the floating body with regards to the frame and the equivalent stiffness (k, eq. 1) in the x-y plane.

The above-mentioned displacement is measured by at least one displacement sensor mounted between the floating body and the frame.

In the preferred embodiment such displacement sensor is a biaxial Hall effect sensor, with the permanent magnet connected to the floating body and the Hall transducer mounted on the first frame.

In another embodiment, more than one displacement sensor is mounted at the same distance from the axis of the floating for redundancy purposes. In fact, the failure of one of the displacement transducers could be easily detected as the occurrence of an inconsistency among the data read.

Another type of displacement transducer, which can be conveniently adopted in this invention, is the solid-state optical position sensors (OPS), although this would require the mounting of active wired components on the floating body.

Still another transducer would be the capacitive one, although with the same wiring issue as the OPS and expectedly a higher sensitivity to electromagnetic disturbances.

Figure 3:
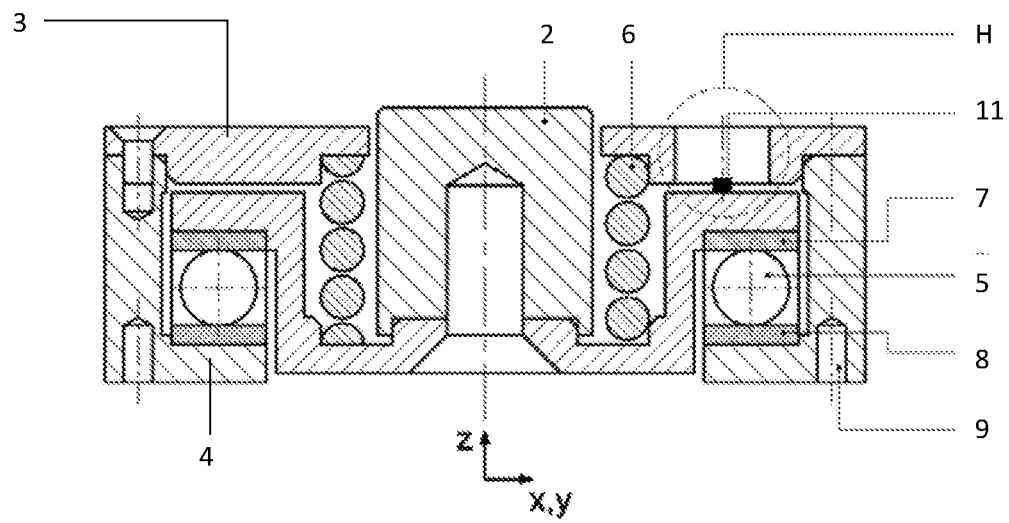
FIG. 3 shows the device in a first embodiment of present invention.
Figure 4:
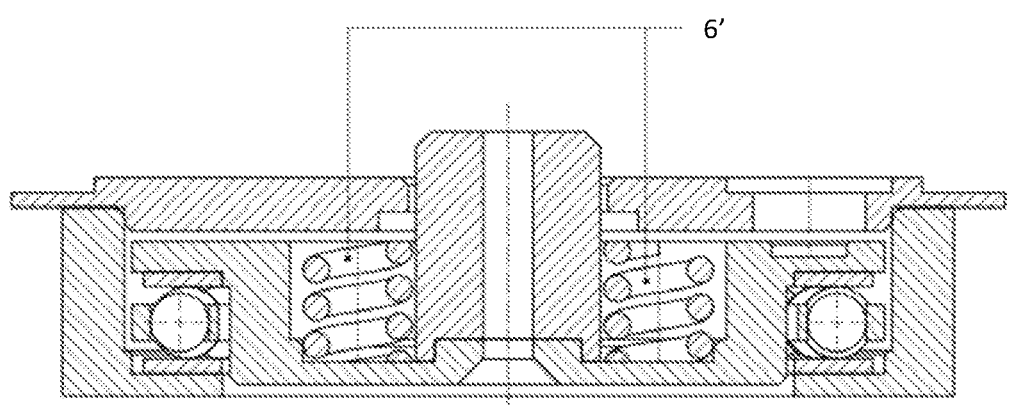
FIG. 4 shows the device in a second embodiment of present invention.

FIG. 3 shows the schematic cross section of the device of a first embodiment the present invention, where the balls 5 are compressed between two rings 7 and 8 of polished and hardened stainless steel by the force provided by the compressed spring 6. The screwed holes 9 at the bottom represent the flange for connecting the compliant sensor to the machine. The output is through the upper part of the central cylinder (floating body, 1). The displacement of the floating body with respect to the frame is proportional to the projection of the interaction force in the x-y plane. To measure such displacement, at least one biaxial position sensor or at least two uniaxial position sensors are used. A housing H of the Hall effect position sensor 10 is shown, a permanent magnet 11 being mounted on the floating body 2. FIG. 4 shows the schematic cross section of the device of a second embodiment of the present invention, in which the compression force of FIG. 3 is equivalently provided by a plurality of at least three compressions springs 6' uniformly distributed around the axis of the sensor.

Figure 5A:
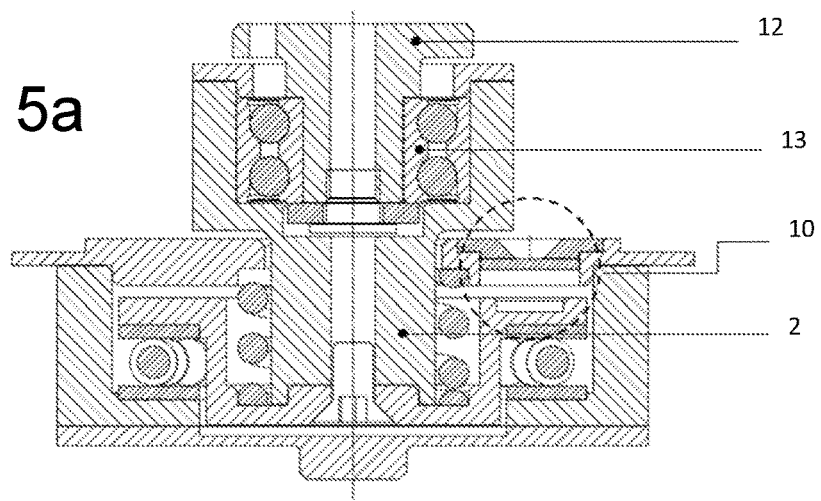
FIGS. 5a-5c show (respectively in a lateral section, from the top and in a prospective view) the device of FIG. 3 hosting a socket of the top.
Figure 5B:
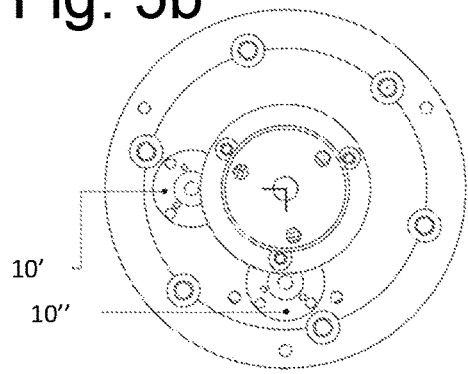
Figure 5C:
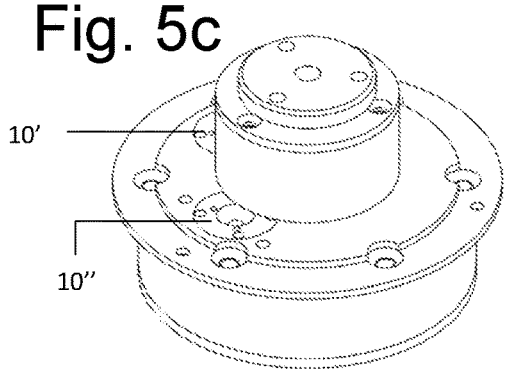

To achieve redundancy, in a preferred configuration two biaxial sensors 10' and 10", positioned in quadrature with each other, are adopted as shown in FIGS. 5b and 5c.

As shown in FIGS. 5a 5b and 5c, the floating body can be shaped so to conveniently host a socket 12, which is free to rotate around its axis thanks to a ball bearing 13. The socket may be configured to host a pivotal joint (e.g. ball bearing) for preventing the transmission of torques (i.e. moments around the axis of the at least one displacement sensor) to the floating body.

Such socket can be used to connect handles, or other terminal organs, which are free to rotate around the axis of the sensor.

Figure 6:
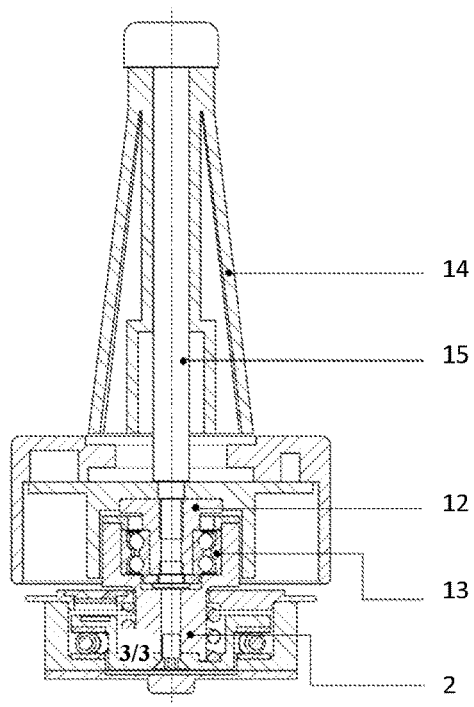
FIG. 6 shows the device of FIG. 5 in which a handle is connected to the socket.

In the same FIG. 6 the pocket for mounting/housing for hosting a position sensor is shown.

Specifically, in FIG. 8 a configuration where the force sensing device is connected to a handle 14 is shown.

The handle 14 is fitted on a shaft 15, having one end inserted in the socket 12 fitted in the inner ring of a ball bearing 13, hosted in the floating body 2. Said handle 14 can translate in the x-y plane.

From a commercial perspective the device can be used as an input device enabling haptic capabilities (e.g. for teleoperation and gaming) or as a compliant force sensor, to be mounted in the proximity of the end-effector for controlling pHRI (e.g. for physical assistance and rehabilitation).

For both applications, the device allows to easily control the interaction force, even in the case of non back-drivable machines, in that the problem of controlling a force is turned into the easier problem of controlling the displacement of the compliant device connected to the end-effector.

In a further commercial application, the device can be used as an insulation means to isolate a load, connected to the floating body, from transverse vibrations in the x-y plane (FIG. 3). For this application, no position sensors may be necessary.

The translation of the floating body according to the present invention occurs without resorting to carriages, rails or other mechanical means kinematically equivalent to prismatic joints. The configuration disclosed herein simplifies the design, reduces encumbrance, weight and cost and avoids undesired hysteresis or other non-linear behaviours in the force-displacement response due to friction.

The elastic element is the core component of the disclosed sensor, as it provides a simple way to generate an isotropic centering force within a minimal mechanical design. Indeed, springs are normally used in tension-compression modes. In the device disclosed herein the axis of the elastic element bends, assuming a "S" shape, i.e. the spring is laterally deformed. The translation of the floating body on the plane of operation is not constrained by any kinematic couples, while the laterally deformed spring generates an elastic centering force, which is the same in all directions. The combination of the spring and the caged balls without tracks, provides the isotropic centering (resistive) force in the working plane. This configuration differentiates the present invention from known techniques.

In summary, this invention is novel in that the specific arrangement of its parts generates a compliance that is higher than that of load cells and isotropic in a plane. Such isotropic compliance is achieved without resorting to elastomeric materials, whose mechanical properties may change in time as an effect of ageing and thermal phenomena. The motion of the floating body does not require tracks or other lower kinematic couples/pairs.

Compared to existing devices, the invention described herein has the following advantages and improvements:
1. isotropic stiffness in any directions of a given plane;
2. low stiffness (as low as 103 N/m);
3. overload protection against tilting moments;
4. self-centering capability;
5. no dry friction between moving parts;
6. compactness, thanks to the inverted "T" shape of the FB and the absence of tracks or similar devices for constraining motion;
8. low hysteresis, low sensitivity to humidity, resistance to UV exposure, low ageing effects thanks to the absence of polymeric parts;
9. small sensitivity to thermal effects due to dilation;
10. low fabrication cost, in that: i) only conventional machining technologies are required for the fabrication of its parts; ii) no tracks or other kinematic couples are needed;
11. proportional behavior without hysteresis regions: no static friction, only rolling friction.

The invention claimed is:

1. A device, with isotropic planar compliance, comprising:
    a floating body (2) positioned between a first (3) and second frame (4),
    said floating body having an extended portion (21) protruding through the first frame,
    at least a row of caged balls (5) supporting the floating body,
    at least one elastic element (6) positioned over the extended portion of the floating body, compressed between and connecting the floating body and the first frame,
    said caged balls allow the at least one elastic element to laterally deform, so that their an axis thereof bends, while the ends of said at least one elastic element lay on two parallel planes, which remain at constant distance while sliding one with respect to the other, and
    at least one displacement sensor (10), for measuring the displacement of the floating body with respect to the first or second frame.

2. The device according to claim 1, wherein said displacement sensor comprising two uniaxial displacement sensors (10', 10") mounted in quadrature with each other.

3. The device according to claim 1, wherein said displacement sensor comprising at least one biaxial displacement sensor.

4. The device according to claim 1, wherein said displacement sensor comprising two biaxial displacement sensors (10', 10") mounted in quadrature with each other.

5. The device according to claim 1, wherein said displacement sensor is mounted between the floating body (2) and the first frame (3).

6. The device according to claim 1, wherein said displacement sensor is a biaxial Hall effect sensor comprising a permanent magnet connected to the floating body (2) and a Hall transducer mounted on the first frame (3).

7. The device according to claim 1, wherein said least one displacement sensor is a plurality of displacement transducers mounted on the first frame.

8. The device according to claim 7, wherein said plurality of displacement transducers are solid-state optical position sensors or capacitive transducers.

9. The device according to claim 1, further comprising rings (7,8) positioned between the first or second frame and floating body for compressing the caged balls (5).

10. The device according to claim 1, wherein the floating body is shaped so to conveniently host a socket (12), which is free to rotate around its axis thanks to a ball bearing (13).

11. The device according to claim 10, wherein said socket is connected to handles (14) or other terminal organs.

12. The device according to claim 1, wherein the first frame comprises a housing (H) for mounting/housing the at least one displacement sensor.

* * * * *